(12) United States Patent
Baker

(10) Patent No.: US 8,142,005 B2
(45) Date of Patent: Mar. 27, 2012

(54) INK JET PRINTING SYSTEM

(75) Inventor: Richard J. Baker, West Lebanon, NH (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 11 days.

(21) Appl. No.: 11/429,680

(22) Filed: May 8, 2006

(65) Prior Publication Data

US 2006/0251776 A1 Nov. 9, 2006

Related U.S. Application Data

(60) Provisional application No. 60/679,401, filed on May 9, 2005.

(51) Int. Cl.
G01D 11/00 (2006.01)
(52) U.S. Cl. .......................... 347/100; 347/95
(58) Field of Classification Search .................. 347/100, 347/95, 96, 101, 106, 107, 109
See application file for complete search history.

(56) References Cited

U.S. PATENT DOCUMENTS

| | | | |
|---|---|---|---|
| 4,825,227 A | 4/1989 | Fischbeck et al. | |
| 4,937,598 A | 6/1990 | Hine et al. | |
| 5,265,315 A | 11/1993 | Hoisington et al. | |
| 5,407,474 A | 4/1995 | Airey et al. | |
| 5,637,139 A * | 6/1997 | Morelos et al. | 106/31.37 |
| 5,659,346 A | 8/1997 | Moynihan et al. | |
| 5,757,391 A | 5/1998 | Hoisington | |
| 5,852,075 A * | 12/1998 | Held | 347/100 |
| 6,417,249 B1 | 7/2002 | Nguyen et al. | |
| 6,467,897 B1 * | 10/2002 | Wu et al. | 347/102 |
| 2003/0231226 A1 | 12/2003 | Ishikawa et al. | |
| 2004/0004649 A1 | 1/2004 | Bibl et al. | |
| 2004/0086603 A1 | 5/2004 | Shastry et al. | |
| 2004/0175463 A1 * | 9/2004 | Shastry et al. | 426/104 |
| 2005/0003055 A1 * | 1/2005 | Baydo et al. | 426/383 |
| 2005/0157148 A1 | 7/2005 | Baker et al. | |
| 2006/0187285 A1 * | 8/2006 | Oyanagi et al. | 347/100 |

FOREIGN PATENT DOCUMENTS

| | | |
|---|---|---|
| EP | 0 412 548 A2 | 2/1991 |
| EP | 705890 A1 * | 4/1996 |
| EP | 1 219 690 A1 | 7/2002 |
| EP | 1 403 343 A1 | 3/2004 |
| JP | H5-169790 | 7/1993 |
| JP | 2002-355966 | 12/2002 |
| JP | 2007-526765 | 9/2007 |
| WO | WO 03/048260 A1 | 6/2003 |
| WO | 2004/003089 | 1/2004 |
| WO | 2004/081126 | 9/2004 |
| WO | WO 2006/023615 A1 | 3/2006 |

OTHER PUBLICATIONS

International Preliminary Report on Patentability dated Mar. 19, 2009 from PCT/US2006/017548.
International Search Report and Written Opinion dated Jun. 4, 2008 from PCT/US2006/017548.
Office Action dated Nov. 16, 2010 issued in counterpart European application No. 06759218.8, 5 pgs.
Office Action dated Jul. 14, 2010 issued in counterpart Chinese application No. 200680015688.4, 6 pgs.
Office action dated Mar. 1, 2011 issued in Japanese application No. 2008-511208, 5 pgs.

* cited by examiner

*Primary Examiner* — Manish S Shah
(74) *Attorney, Agent, or Firm* — Fish & Richardson P.C.

(57) ABSTRACT

A system for printing on an edible substrate includes an inkjet printer and a jetting fluid. The fluid is suitable for use on an edible substrate, and has a desirable viscosity and surface tension.

19 Claims, 2 Drawing Sheets

INK JET PRINTING SYSTEM

CROSS REFERENCE TO RELATED APPLICATION

This application claims priority from U.S. Provisional Patent Application No. 60/679,401, filed on May 9, 2005, the contents of which is incorporated herein by reference in its entirety.

TECHNICAL FIELD

This invention relates to jetting systems.

BACKGROUND

Inkjet printers typically include an ink path from an ink supply to a nozzle path. The nozzle path terminates in a nozzle opening from which ink drops are ejected. Ink drop ejection is controlled by pressurizing ink in the ink path with an actuator, which may be, for example, a piezoelectric deflector, a thermal bubble jet generator, or an electrostatically deflected element. A typical printhead has an array of ink paths with corresponding nozzle openings and associated actuators, such that drop ejection from each nozzle opening can be independently controlled. In a drop-on-demand printhead, each actuator is fired to selectively eject a drop at a specific pixel location of an image as the printhead and a printing substrate are moved relative to one another. In high performance printheads, the nozzle openings typically have a diameter of 50 microns or less, e.g. around 35 microns, are separated at a pitch of 100-300 nozzle/inch, have a resolution of 100 to 3000 dpi or more, and provide drop sizes of about 1 to 70 picoliters or less. Drop ejection frequency is typically 10 kHz or more.

Piezoelectric inkjet print assemblies are described in U.S. Pat. Nos. 5,265,315, 4,825,227, 4,937,598, 5,659,346 and 5,757,391; and in published U.S. Patent Application No. 2004/0004649, the entire contents of each is hereby incorporated by reference herein.

It is sometimes desirable to print on food products. An edible ink for a piezoelectric ink jet printer is described in WO03/048260, the entire contents of which is hereby incorporated by reference.

SUMMARY

This invention relates to jetting systems for printing on edible substrates.

In one aspect, the invention features a system for printing on an edible substrate. The system includes a high frequency piezoelectric inkjet printer for jetting at 10 kHz or greater and a fluid for printing on an edible substrate including a surfactant, the fluid preferably having a surface tension of about 20 dynes/cm to about 40 dynes/cm. The edible substrate remains edible after being printed with the fluid.

In another aspect, the invention features a method of printing on an edible substrate, including providing an inkjet printer; obtaining an pre-fluid having a surface tension of greater than about 36 dynes/cm; adding a sufficient amount of a surfactant to reduce the surface tension of the fluid by at least 10 percent to obtain a low surface tension fluid suitable for applying to the substrate, the edible substrate remaining edible after printing; and jetting the fluid onto an edible substrate.

In another aspect, the invention features a system for printing on an edible substrate. The system includes a piezoelectric inkjet printer configured to jet at 10 kHz or greater and a fluid for printing on an edible substrate. The fluid includes a surfactant that includes a polysiloxane and that has a surface tension of about 20 dynes/cm to about 40 dynes/cm. The edible substrate remains edible after being printed with the fluid.

In another aspect, the invention features a method of printing on an edible substrate. The method includes providing an inkjet printer; obtaining a pre-fluid having a surface tension of greater than about 36 dynes/cm; and adding a sufficient amount of a surfactant comprising a polysiloxane to the pre-fluid to reduce the surface tension by at least 10 percent to obtain a lower surface tension fluid suitable for applying to an edible substrate, the edible substrate remaining edible after printing; and jetting the lower surface tension fluid onto the edible substrate.

Embodiments may include one or more of the following. The surface tension is from about 26 dynes/cm to about 36 dynes/cm, e.g., about 28 dynes/cm to about 32 dynes/cm. The fluid has a viscosity of about 5 to 25 cps, e.g. about 10 to 14 cps. The fluid is substantially aqueous. The surfactant is an ether-modified polydimethylsiloxane, a polydimethylsiloxane, a lecithin, a lecithin derivative, a phospholipid, a glycerol ester, an amphoteric amino acid, an amphoteric imino acid, a sorbitol, sorbitan, a glycol ester, a glycerol ester, an ester-modified polydimethylsiloxane, or mixtures of these. The concentration of the surfactant in the fluid is from about 2 g/L to about 40 g/L. The inkjet printhead includes a pumping chamber, the pumping chamber formed, at least in part, of metal, carbon, or silicon. The printhead includes a nozzle opening. The nozzle opening is defined in metal, carbon or silicon. The printhead has a nozzle opening of about 50μ or less. The printhead has a resolution of 100 dpi or greater. The printhead operates at a jetting temperature of about 50° C. or more. The system includes a deaeration lung.

In other aspects the invention features a fluid for use in a system for printing on an edible substrate that includes a surfactant, such as an ether-modified polydimethylsiloxane.

Embodiments and/or aspects may be include one or more of the following advantages. The compositions can be used to print onto edible substrates, allowing for branding and marking of such substrates. Such markings can delight and/or amuse consumers. In particular, printing on edible substrates can be fun and educational for children. The compositions can improve printing accuracy of printheads by improving size and velocity uniformity of drops ejected from such printheads. The compositions can also enable higher frequency drop ejection by reducing voids in pumping chambers, which can improve the resolution of ejected drops.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control.

Other features and advantages of the invention will be apparent from the following detailed description.

DETAILED DESCRIPTION

Figure 1:
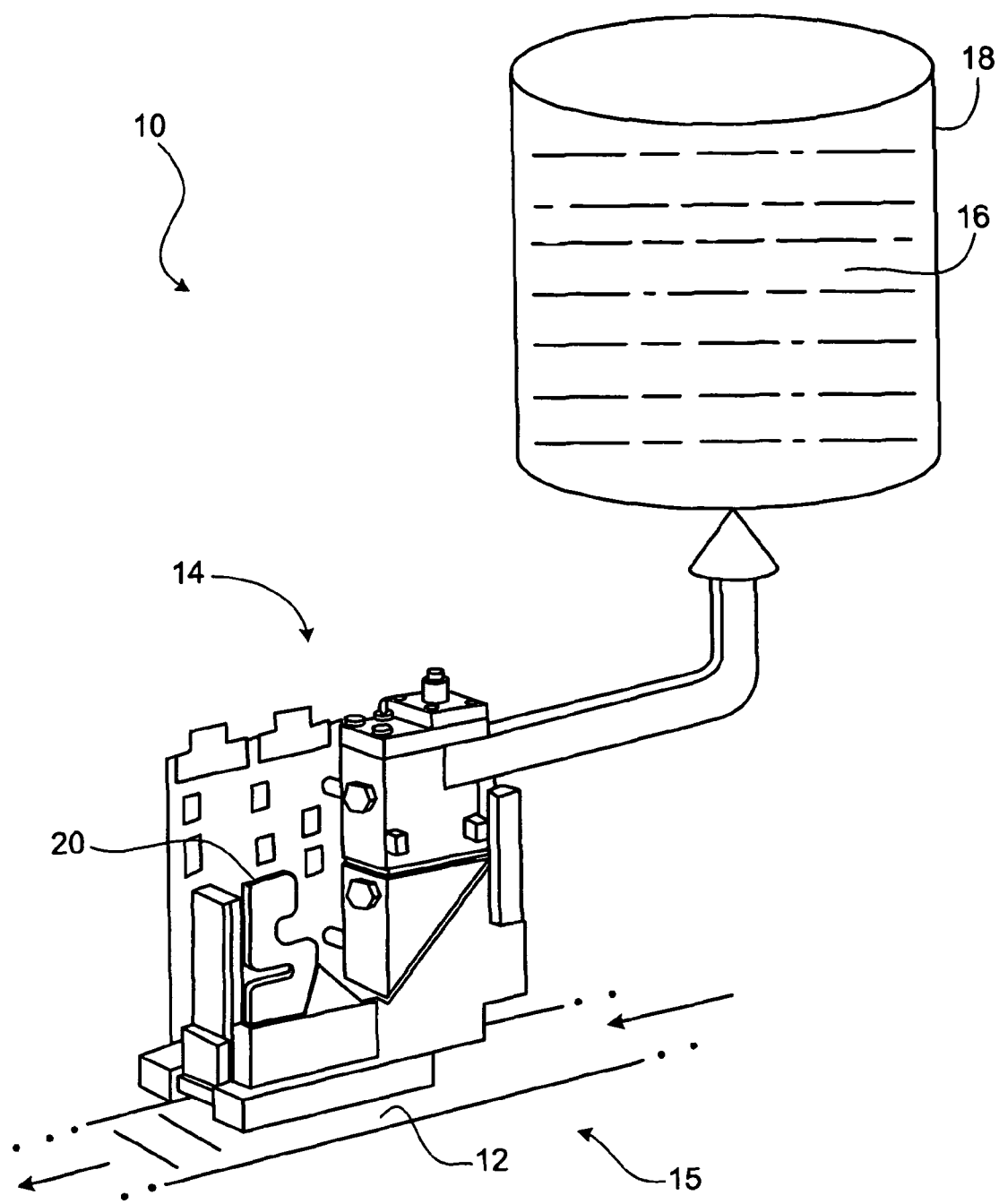
FIG. 1 is a perspective schematic view of a printing apparatus including a printing module and ink supply.
Figure 2:
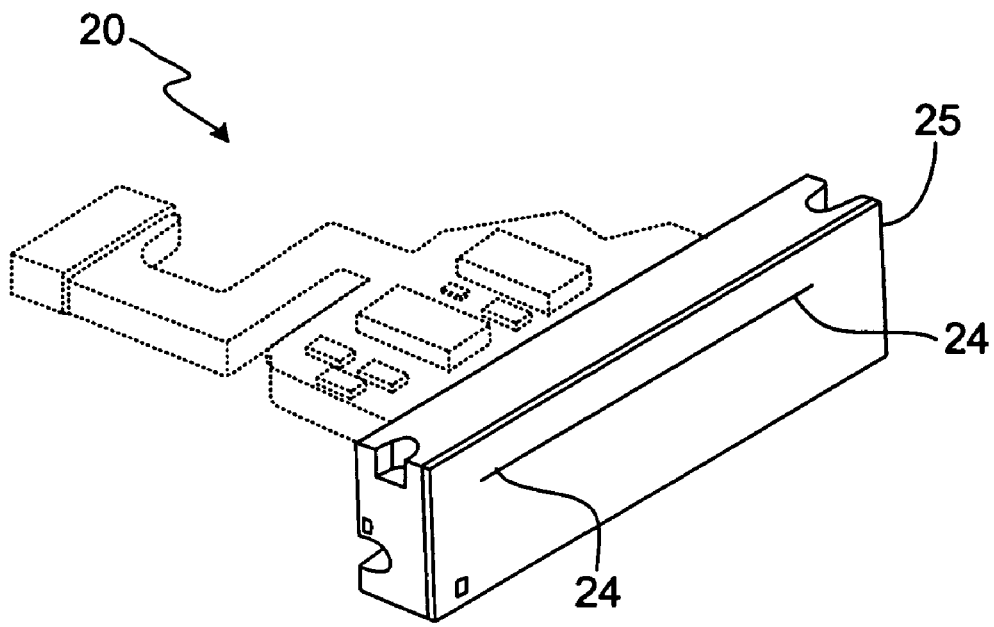
FIG. 2 is a perspective front view of a printhead.
Figure 3:
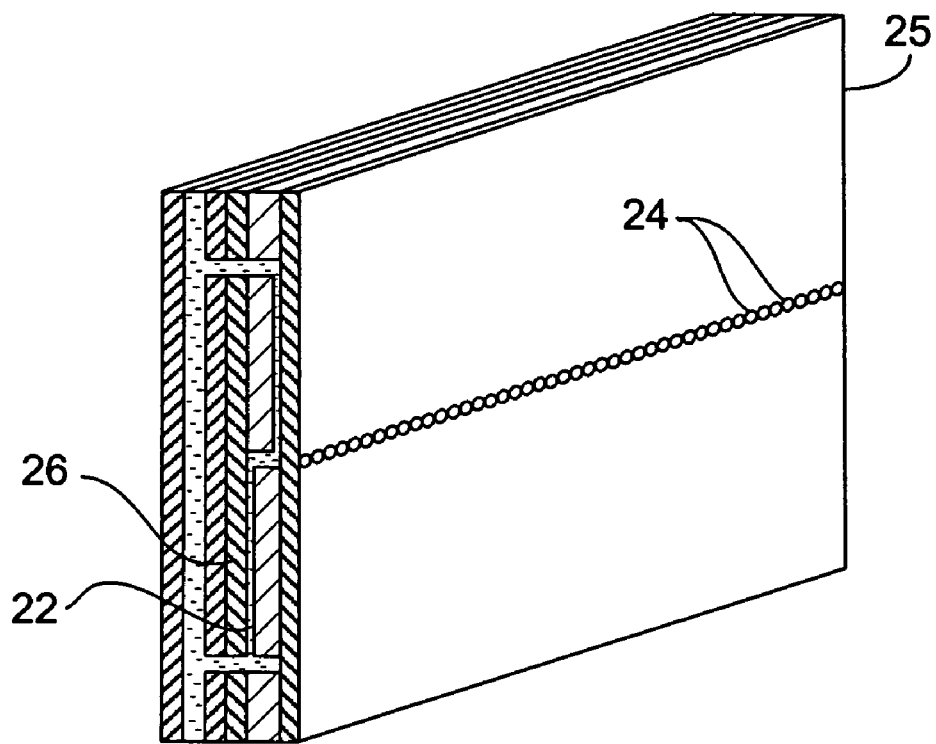
FIG. 3 is an enlarged perspective view of a portion of a printhead.

Referring to FIGS. 1-3, a system 10 for printing on food includes a piezoelectric print module 14, a jetting fluid 16 held in ink supply 18 and a substrate transport arrangement 15 for moving an edible substrate 12 under print module 14. The jetting fluid 16 is formulated in combination with printing module 14 to enhance reliable printing onto edible substrate 12. In particular, the print module is a high frequency jetting module and the jetting fluid has a select surface tension and viscosity, while being suitable for use with edible substrates.

Referring particularly to FIGS. 2 and 3, an inkjet printhead 20 includes a plurality of flow paths, each with a pumping chamber 22 and an ejection orifice 24 defined in an orifice plate 25. Jetting fluid 16 from the supply is pressurized in the pumping chamber 22 by piezoelectric element 26 to form drops that are ejected toward substrate 12. Drop ejection frequency is typically 10 kHz or more, e.g. 20-30 kHz. The flow path is defined in components formed of carbon, such as the pumping chamber, and metals, such as the orifice plate made, e.g., of stainless steel. A particular inkjet printhead is the Spectra Nova-AAA jetting printing module having 256 independently addressable jets that is capable of operation of up to 600 dpi is available from Spectra, Inc., Hanover, N.H. The printing module has the following characteristics.

| OPERATING PARAMETERS | UNITS | VALUE |
| --- | --- | --- |
| Nozzle Spacing | inches (microns) | 0.011 (279) |
| Native Resolution | dpi | 90 |
| Nozzle Diameter | microns | 54 |
| Calibrated drop size | picoliters | 80 |
| Adjustment range for Drop Size | picoliters | 60-100 |
| Drop Size Variation, 1 σ | percent | 5 |
| Jet Straightness, 1 σ | degrees | 0.5 |
| Normal Drop Velocity | meters/second | 9 |
| Velocity Variation, 1 σ | percent | 5 |
| Crosstalk, Maximum | percent | 5 |
| Operating Temperature | ° C. (° F.) | 125 (257) |
| Maximum Frequency | KHz | 38 |
| Viscosity Range (at jetting temp.) | centipoise (cP) | 8-20 |
| Estimated Minimum Life | billion drops per jet | 25 |
| Electrical Interface | type | RS-422 |
| Ink Filter | microns absolute | 8 |
| Meniscus Vacuum | inches water gauge (inwg) | 2.0-4.0 |
| Lung Vacuum | inches Hg gauge | 22 |
| Nozzle Line Length | inches (mm) | 2.82 (71.6) |
| Length × Width × Height | inches (mm) | 4 × 1 × 4 (102 × 25 × 102) |

The system can include a deaeration lung. Deaeration lungs are described in U.S. Pat. No. 5,489,925, the entire contents of which is hereby incorporated by reference herein.

The jetting fluid is jetted in the form of regular fluid drops having a predictable volume, trajectory, shape and drop velocity and to sustain such jetting over the range of printing conditions. The jetting fluid is suitable for use with edible substrates and has a surface tension and viscosity that enhances jetting quality. The surface tension is such that the jetting fluid effectively wets fluid contacting surfaces of the module, such as the pumping chamber and the nozzle plate. Proper wetting encourages drop formation, while reducing ingestion of air into the chamber, and enhancing the efficiency of deaeration lungs. The viscosity, under jetting conditions, is such that the flowability of the fluid spreads effectively over the wetted surfaces under the varying pressure conditions caused by the module.

In particular embodiments, the jetting fluid is a commercially available, substantially aqueous food-grade fluid that has been modified with a surfactant that can be used with edible substrates. In particular, the modified fluid has a surface tension from about 20 dynes/cm to about 40 dynes/cm. In specific embodiments, the fluid has a surface tension of from about 26 dynes/cm to about 36 dynes/cm, e.g., from about 28 dynes/cm to about 32 dynes/cm. Surface tension is measured using the Du Nouy method. The Du Nouy method can be performed, e.g., using the Sigma KSV 703 tensiometer available from KSV Instruments. The viscosity of the fluid is, e.g., from about 5 centipoise to about 25 centipoise at room temperature, e.g., from about 10 centipoise to about 14 centipoise. Viscosity is measured by ASTM D2196 using a rotating cylinder-type viscosimeter. A suitable instrument is the Model DV-III Programmable Rheometer with Thermoset System 3 sample holder controlled by a Model 106 Programmable Temperature Controller, available from Brookfield, Middleboro, Mass. At 60 rpm with a #18 spindle, the system can measure viscosity up to about 49.9 cps. Higher viscosities can be measured with a parallel plate viscometer. Surface tension and viscosity measurements are all measured at the jetting temperature, e.g., 50-55° C.

Surfactants include ionic surfactants, e.g., anionic, cationic or amphoteric, and non-ionic surfactants. Exemplary surfactants include polysiloxanes, e.g., ether-modified or polyether-modified polydimethylsiloxanes, hydroxy-functional polydimethylsiloxanes, ester-modified or a polyester-modified polydimethylsiloxanes, polydimethylsiloxane, octamethylcyclotetrasiloxane, phenyl siloxanes, dimethicones, silsesquioxanes, e.g., fully or partially condensed silsequioxanes, silicone waxes, alkylmethylsiloxanes, dimethicone copolyols, lecithin, lecithin derivatives, phospholipids, glycerol esters, amphoteric amino acids, amphoteric imino acids, sorbitol, sorbitan, glycol esters, or mixtures of these surfactants.

Silsesquioxanes include fully condensed silsequioxanes, partially condensed silsequioxanes and polymeric silsesquioxanes. For example, fully condensed silsequioxanes include 1,3,5,7,9,11,13,15-octakis-(dimethylsilyloxy)-pentacyclo [$9.5.1.1^{3,9}.1^{5,15}.1^{7,13}$]octasiloxane and 1-(2-trans-cyclohexanediol)ethyl-3,5,7,9,11,13,15-isobutylpentacyclo-[$9.5.1.1^{3,9}.1^{5,15}.1^{7,13}$]octasiloxane. Partially condensed silsequioxanes include 1,3,5,7,9,11,14-heptacyclopentyl-tricyclo-[$7.3.3.1^{5,11}$]heptasiloxane-endo-3,7,14-triol and 1,3,5,7,9,11-octacyclopentyl-tetracyclo[$7.3.3.1^{5,11}$]octasiloxane-endo-3,7-diol. An example of a polymeric silsesquioxane is poly[(propylmethacryl-heptaisobutyl-PSS)-co-(n-butyl-methacrylate)]. Other surfactants include polyoxyethylenated alkylphenols (mostly p-octyl-, p-nonyl-, p-dodecyl-, dinonylphenols), polyoxyethylenated straight chain alcohols, polyoxyethylenated polyoxypropylene glycols, polyoxyethylenated mercaptans, long chain carboxylic acid esters (glyceryl and polyglyceryl esters of natural fatty acids, propylene glycol, sorbitol, and polyoxyethylenated sorbitol esters, polyoxyethylene glycol esters), alkanolamines (diethanolamine-, isopropanolamine-fatty acid condensates), and alcohols, citric acid, succinic acid, diacetyl tartaric acid esters, mono and diglycerides, lactic acid esters, acetic acid esters, citric acid esters, succinic acid esters, sorbitan esters, sucrose esters, polyethylene oxide, polypropylene oxide, copolymers condensates of ethylene oxide and propylene oxide, sodium lauryl sulfate, polysorbate 60 and 80, methyl glucoside-coconut oil ester or mixtures of these surfactants.

Polysiloxanes are available from Noveon, under the tradename UTRASIL™, Dow Corning® and Struktol Company of America. In particular, ether-modified polydimethylsiloxanes are available from BYK Chemie, e.g., BYK333. Silsesquioxanes are available from Aldrich Chemical or from Reade Advanced Materials. Preparation of silsesquioxanes and their reaction chemistry is generally discussed in "Silsesquioxanes, Bridging the Gap Between Polymers and Ceramics", Chemfiles, Vol. 1, No. 6, 2001 (Aldrich Chemical), the entire contents of which is hereby incorporated by reference herein. Useful surfactants are generally recognized as safe as direct food additives under 21 CFR or the surfactants are EAFUS-listed, i.e., included on the Food and Drug Administration's list of "everything added to food in the United States." Other useful surfactants are those that could get listed.

Jetting fluids can be prepared by adding a sufficient quantity of any of the above surfactants to a pre-fluid, e.g., a base ink. A suitable base fluid is the "FG" family of inks from Sensient/Formulabs, Escondido, Calif. The inks are composed, in order of decreasing amount, propylene glycol, glycerine, purified water, isopropyl alcohol, and organic dye. The blue ink includes FD&C Blue No. 1 and Red No. 3. The red ink includes Red No. 3, Red No. 40, and Blue 1. The yellow ink includes Yellow No. 5, Red No. 50, and Blue No. 1. The green ink includes Yellow No. 5, Blue No. 1, and also includes sodium hydroxide. These inks are, respectively, not less than 2.1%, 2-3%, 2.0%, and 2.0% pure dye. In embodiments, jetting fluid is prepared by adding a sufficient quantity of any of the above surfactants to the base ink having a surface tension of greater than about 36 dynes/cm. A sufficient amount of the selected surfactant is added to the pre-fluid to reduce the surface tension of the fluid by at least 10 percent, e.g., 12 percent, 15 percent, 20 percent, 25 percent, 50 percent or more, e.g., 75 percent, to obtain a lower surface tension fluid suitable for applying to the substrate. The surfactant is chosen such that the edible substrate remains edible after applying the fluid. In some implementations, the surfactant is added to the base fluid such that a concentration of the surfactant in the fluid is from about 2 g/L to about 40 g/L, e.g., 5 g/L, 10 g/L, 20 g/L or higher, e.g., 35 g/L. In particular embodiments, an ether-modified polydimethylsiloxane is added at about 0.1 weight percent to about 1 weight percent, e.g., about 0.5 weight percent.

The fluid can include water, e.g., from about 1 weight percent to about 20 weight percent water. The fluid can optionally include solids suspended in the fluid. For example, the solids can be titanium dioxide, silica, pigments, e.g., lake pigments, or mixtures of these solids. In some implementations, an average particle size of the solids in the fluid is from about 0.05 micron to about 3 micron, e.g., 0.1 micron, 0.25 micron, 1 micron or greater, e.g., 2.5 micron. The solids can make up from about 1 weight percent to about 30 weight percent of the fluid. The fluid can include a humectant, e.g., to reduce premature drying. For example, the humectant can be polyethylene glycol, polypropylene glycol, a carbohydrate, a polyol, sorbitol, a polyacrylic acid or mixtures of these materials. The fluid can include, e.g., from about 5 weight percent to about 80 weight percent humectant. The fluid can further include a viscosity builder or bodying agent. For example, the bodying agent can be a polymer, a salt, e.g., a lithium salt or mixtures of salts and polymers. In a specific embodiment, the bodying agent is propylene glycol alginate. The bodying agent can make up, e.g., from about 1 weight percent to about 30 weight percent of the fluid. The fluid can include a defoaming agent. For example, the defoaming agent can be polyethylene oxide, a silicon oil, a polydimethylsiloxane, a polysorbate, sorbitan monostearate or aluminum stearate. The defoaming agent can make up from about 1 weight percent to about 5 weight percent of the fluid. The fluid can include a biocidal agent. For example, the biocidal agent can be a paraben, an amino acid, a silver compound, e.g., a silver salt, e.g., silver nitrate or mixtures of these biocides. The biocidal agent can make up from about 0.001 weight percent to about 1 weight percent of the fluid. The fluid can include colorants. Suitable colorants include, e.g., solids, e.g., lake pigments or soluble colorants, e.g., FD&C Blue No. 1, FD&C Red No. 3, FD&C Red No. 40, and FD&C Yellow No. 5. In embodiments, the jetting fluid itself is not edible, but becomes edible after setting, e.g., after a solvent has evaporated.

Ingredients suitable for edible media are described in WO03/048260, the entire contents of which are hereby incorporated by reference. Suitable flavorings include sugars, or extracts, such as fruit spice extracts. The media preferably includes edible components that are listed as a Generally Recognized as Safe direct food additive (GRAS) in section 21 of the Code of Federal Regulations or is EAFUS-listed, i.e., included on the Food and Drug Administration's list of "everything added to food in the United States." An "edible media" is an ink that contains less than 100 ppm by weight of any impurities, i.e., any components that are not listed as GRAS or are not EAFUS-listed.

Suitable substrates include fruits, chocolate, candies, chips or other foods which can be consumed.

A number of embodiments of the invention have been described. Nevertheless, it will be understood that various modifications may be made without departing from the spirit and scope of the invention.

While a piezoelectric actuator has been described, other actuators are possible. For example, thermal bubble jet actuators or electrostatically deflected actuators can be used.

Rather than printing on the substrate, the jetting fluid can be applied to an edible substrate to flavor and/or to provide a scent to the substrate.

What is claimed is:

1. A method comprising jetting a non-edible fluid from an inkjet printer onto a chocolate, a candy or a chip that is to be consumed, to form an edible print on the chocolate, candy or chip that is to be consumed; wherein the edible print contains less than 100 ppm by weight of any impurities that are not listed as safe direct food additive (GRAS) or are not everything added to food in the United States (EAFUS) listed.

2. The method of claim 1, wherein the non-edible fluid has a viscosity of about 5 to about 25 cps.

3. The method of claim 1, wherein the non-edible fluid has a viscosity of about 10 to about 14 cps.

4. The method of claim 1, wherein the non-edible fluid comprises water.

5. The method of claim 1, wherein the inkjet printer includes a pumping chamber, the pumping chamber being formed, at least in part, of metal, carbon, or silicon.

6. The method of claim 1, wherein the printer includes a nozzle opening, the nozzle opening being defined in metal, carbon or silicon.

7. The method of claim 1, wherein the printer has a nozzle opening of about 50 μm or less.

8. The method of claim 1, wherein the printer has a resolution of about 100 dpi or greater.

9. The method of claim 1, wherein the non-edible fluid is jetted at a temperature of about 50° C. or more.

10. The method of claim 1, wherein the inkjet printer is a piezoelectric inkjet printer.

11. The method of claim 1, wherein the inkjet printer is configured to jet at about 10 kHz or greater.

12. The method of claim 1, wherein the edible print is formed by evaporating solvent of the non-edible fluid.

13. The method of claim 1, further comprising making the non-edible fluid by adding a surfactant into a pre-fluid to adjust a surface tension of the pre-fluid.

14. The method of claim 13, wherein a concentration of the surfactant in the non-edible fluid is from about 2 g/L to about 40 g/L.

15. The method of claim 13, further comprising repeating the adding step until the surface tension of the non-edible fluid is from about 20 dynes/cm to about 40 dynes/cm.

16. The method of claim 13, wherein the surface tension is reduced by at least about 25 percent.

17. The method of claim 13, wherein the surfactant comprises polysiloxane.

18. The method of claim 17, wherein the polysiloxane is selected from the group consisting of an ether-modified polydimethylsiloxane, a polyether-modified polydimethylsiloxane, a hydroxy-functional polydimethylsiloxane, an ester-modified polydimethylsiloxane, a polyester-modified polydimethylsiloxane, a polydimethylsiloxane, a octamethylcyclotetrasiloxane, a phenyl siloxane, a dimethicone, a silsesquioxane, a silicone wax, an alkylmethylsiloxane, a dimethicone copolyol, and mixtures thereof.

19. The method of claim 17, wherein the polysiloxane comprises an ether-modified polydimethylsiloxane.

* * * * *